US008308857B2

(12) United States Patent
Couillard et al.

(10) Patent No.: US 8,308,857 B2
(45) Date of Patent: Nov. 13, 2012

(54) FILTER CASSETTE FOR ALLOWING A LEAK THEREIN TO BE DETECTED AND METHOD THEREOF

(75) Inventors: Sylvain Couillard, Verdun (CA); Simon Caron, Montréal (CA)

(73) Assignee: SCL Medtech Inc., Montreal (CA)

( * ) Notice: Subject to any disclaimer, the term of this patent is extended or adjusted under 35 U.S.C. 154(b) by 567 days.

(21) Appl. No.: 12/350,358

(22) Filed: Jan. 8, 2009

(65) Prior Publication Data

US 2009/0223372 A1 Sep. 10, 2009

Related U.S. Application Data (60) Provisional application No. 61/006,358, filed on Jan. 8, 2008.

(51) Int. Cl.
*B01D 49/00* (2006.01)
(52) U.S. Cl. .............. 96/417; 96/421; 95/19; 55/309; 55/320; 73/40; 73/46
(58) Field of Classification Search ............... 73/40, 46; 96/421, 417; 95/19
See application file for complete search history.

(56) References Cited

U.S. PATENT DOCUMENTS

| 5,879,545 A * | 3/1999 | Antoun ........................... 210/90 |
| 2007/0079589 A1 * | 4/2007 | Ekstrom et al. ............... 55/385.1 |

OTHER PUBLICATIONS

WK4346 New Standard Specification for the Reduction and Control of Bypass Leakage and Dust Sample Losses of Personal Air Sampling Cassettes. http://www.astm.org/cgi-bin/SoftCart.exe/DATA-BASE.CART/WORKITEMS/WK4346.htm?L+mystore+layx9313, 2004.
Omega Field Cassette Leak Tester. http://www.omegaspec.com/products/ShowProducts.asp?CatNo=225-8531, 2012.
Baron PA. Aerosol Sampling: Factors Affecting Aerosol Sampling. NIOSH Manual of Analytical Methods, Chapter O, 2003, pp. 184-207.
Baron PA. Aerosol Sampling: Minimizing Particle Loss from Cassette Bypass Leakage. NIOSH Manual of Analytical Methods, Chapter N, 2003, pp. 179-83.
Baron PA. Using a Filter Bypass Leakage Test for Aerosol Sampling Cassettes. Appl Occup Env Hyg, 2002, pp. 593-597.
Baron PA, Khanina A, Martinez AB, Grinshpun SA. Investigation of Filter Bypass Leakage and a Test for Aerosol Sampling Cassettes. Aerosol Sci Technol, 2002, 36:857-865.
Baron PA, Bennett JS. Calculation of Leakage and Particle Loss in Filter Cassettes. Aerosol Sci Technol, 2002, 36: 632-641.
Van Den Heever OJ. Quantification of Bypass Leakage in Two Different Filter Cassettes during Welding Fume Sampling. Am Ind Hyg Assoc. J, 1994, 55: 966-969.

* cited by examiner

*Primary Examiner* — Jason M Greene
*Assistant Examiner* — Dung H Bui
(74) *Attorney, Agent, or Firm* — Novak Druce + Quigg LLP (57) ABSTRACT

A filter cassette and a method for allowing a leak to be detected are disclosed, in which the filter cassette comprises a main body defining a first chamber. The main body includes an inlet and an outlet, a filter separating the first chamber into first and second sub-chambers, the inlet being in fluid communication with the first sub-chamber and the second sub-chamber being in fluid communication with the outlet. The main body also includes a second chamber is defined by the main body and the filter, wherein in absence of a leak the second chamber is substantially not in fluid communication with the first chamber. The main body further includes a port in fluid communication with the second chamber, whereby measuring a fluid characteristic in the second chamber by means of the port allows a detection of a leak, i.e. an external leak or a bypass leakage.

20 Claims, 7 Drawing Sheets

FILTER CASSETTE FOR ALLOWING A LEAK THEREIN TO BE DETECTED AND METHOD THEREOF

FIELD OF THE INVENTION

The present invention generally relates to a filter cassette. More specifically, the present invention is concerned with a filter cassette that allows an external leak or a bypass leakage to be detected.

BACKGROUND OF THE INVENTION

In order to monitor the quality of air, filter cassettes are used for sampling airborne substances, i.e. substances that are in suspension in the air. Typically, a filter cassette comprises a conduit having an air inlet and an air outlet, with a filter being provided therebetween. As air is brought to flow in the conduit from the inlet to the outlet, a portion of the airborne substances comprised in the air are captured by the filter. By analyzing the content of the filter, knowing an air flow and a time exposure, it is possible to make an assessment of the airborne substance concentration.

Problem Description

Two- and three-piece plastic cassettes are commonly used for collecting personal samples of airborne solid particles and/or liquid droplets and/or gas. The cassettes have many applications such as air quality monitoring in work places as well as environmental analyses. The accuracy of related sampling methods is of prime importance.

The cassettes, however, are prone to external leaks and bypass leakage, notably if they are not properly assembled.

Figure 1:
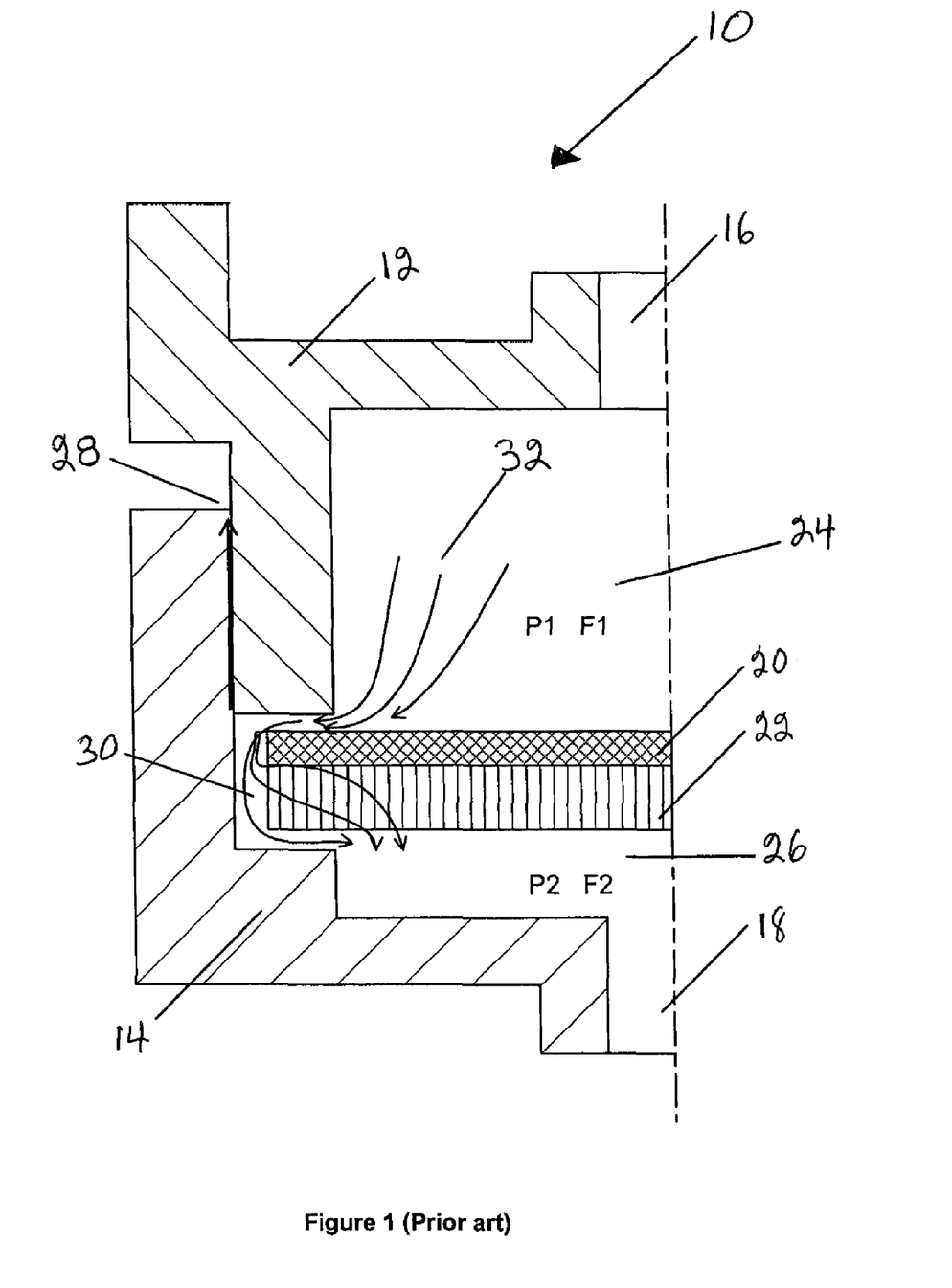
FIG. 1 is a diametrical cross-sectional view of half of a conventional filter cassette.

A known filter cassette 10 is illustrated in FIG. 1. The filter cassette 10 comprises a cap 12 and a base 14. The cap 12 has an inlet 16 for conducting air into filter cassette 10; similarly, the base 14 has an outlet 18 for conducting air from inside the filter cassette 10 to the outside. A filter 20 and a backup pad 22 are interposed between cap 12 and base 14, the cap 12 being atop base 14. Base 14 is so configured as to accommodate cap 12. When cap 12 and base 14 are assembled, filter 20 and backup pad 22 are compressed therebetween, thus forming a first chamber 24 upstream of filter 20, and a second chamber 26 downstream of backup pad 22. Chamber 24 is characterized by a pressure P1 and an airflow F1 entering thereinto via inlet 16; similarly, chamber 26 is characterized by a pressure P2 and an airflow F2 exiting therefrom at 18.

FIG. 1 illustrates an external leak 28, which refers to air flowing from inside filter cassette 10 to the outside thereof. The external leak 28 occurs between cap 12 and base 14. In a three-piece cassette (not shown), which also comprises a ring, an external leak can occur between the cap and the ring, and/or the ring and a base.

FIG. 1 also illustrates a bypass leakage 30, which refers to air 32, from inlet 16, which flows around filter 20 and around or through backup pad 22. In this manner, only a portion of air 32 goes through the filter 20. However, all air will exit filter cassette 10 through outlet 18. Bypass leakage 30 can occur because of improper assembly, for example because of insufficient assembly force or because of misalignment [1].

Both leaks and bypass leakages can result in a loss of airborne substances that should have been collected by filter 20, which in turn reflects in underestimating the concentration thereof. A poorly assembled cassette typically leads to a more than 1% loss of airborne substances [2].

Conventional Testing Methods

To ensure that a filter cassette is properly assembled, the cassette can be tested by using a particle counter for evaluating a number of particles before the filter (inlet) and after the filter (outlet) [3, 4 and 5]. This method, however, does not work well with a fibrous filter, where fibers released therefrom can cause an overestimation (as much as 20-fold) of a leak rate. In addition, air could be leaking while particles that can be detected do not leak, for example because of shape and size of the particles and size of leak.

Figure 2A:
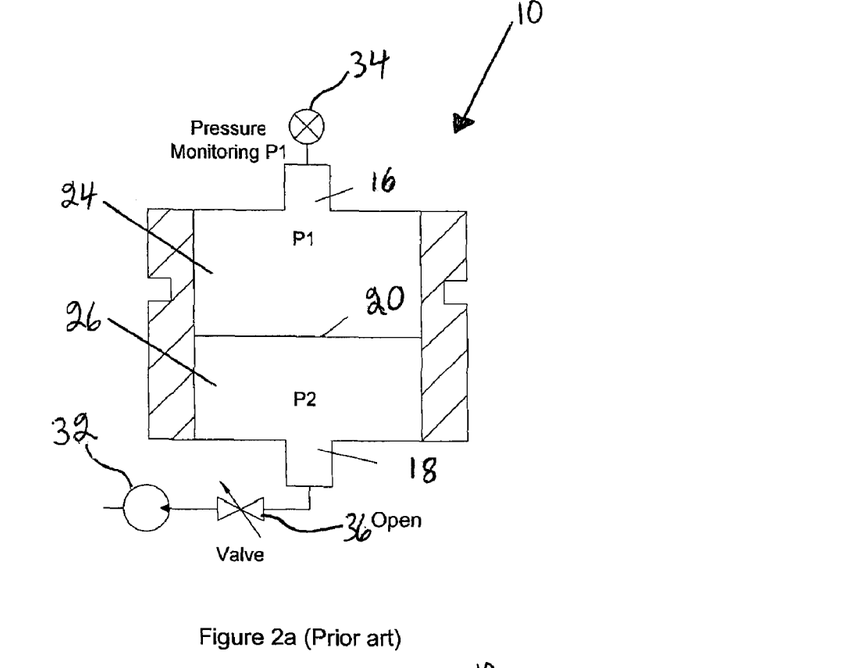
FIGS. 2a and 2b are schematic cross-sectional views of the filter cassette of FIG. 1, wherein a pressure is monitored using a vacuum pump connected to an outlet of the filter cassette, with a valve interposed therebetween being shown in open (FIG. 2a) and closed (FIG. 2b) positions thereof.
Figure 2B:
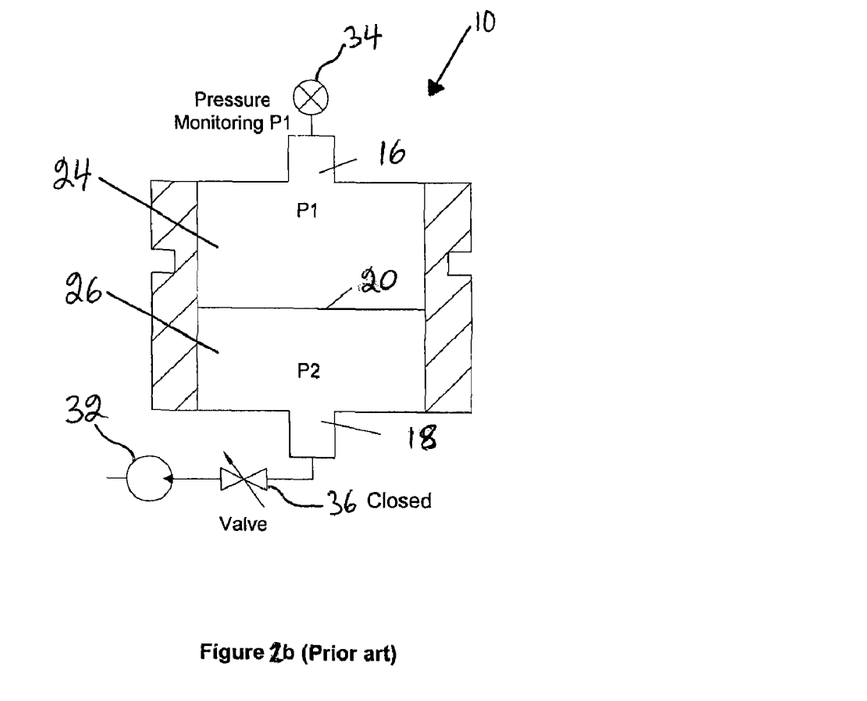

A second method, in reference with FIGS. 2a and 2b, consists in evaluating a pressure stability in filter cassette 10 after drawing vacuum into it [6] by using a vacuum pump 32. A pressure gauge 34 is mounted on inlet 16, the latter being obstructed. A vacuum is drawn from the outlet 18 by using vacuum pump 32, while a valve 36 interposed between vacuum pump 32 and outlet 18 is open (FIG. 2a). Valve 36 is then closed (FIG. 2b). If P1 does not stay equal to P2, then there is an indication that there is an external leak. This second method, however, cannot be used for determining whether there is a bypass leakage around filter 20.

Figure 3:
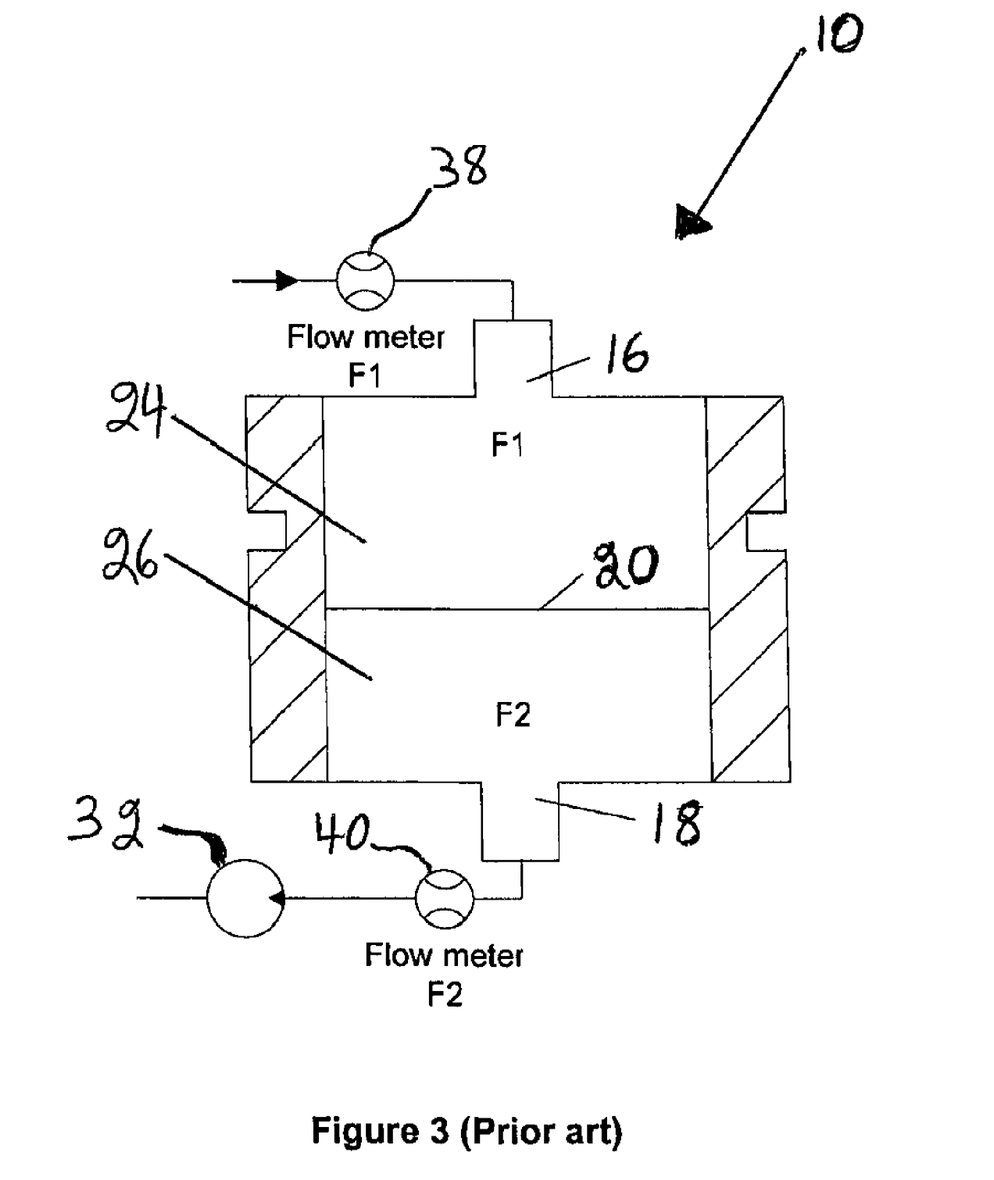
FIG. 3 is a schematic cross-sectional view of the filter cassette of FIG. 1, wherein flows are monitored at an inlet of the filter cassette and at the outlet thereof, with a vacuum pump being connected to the outlet.

A third method, which is an alternative to the second method but nevertheless cannot detect a bypass leakage, consists in measuring flows instead of pressures. As illustrated in FIG. 3, a flow F1 about inlet 16 and a flow F2 about outlet 18 are induced, for example by using vacuum pump 32. A first flow meter 38 is provided just before inlet 16; similarly, a second flow meter 40 is provided just after outlet 18. If there is no external leak, F1 equals F2; otherwise, there is an indication of the presence of an external leak.

SUMMARY OF THE INVENTION

According to the present invention, there is provided a method and device for detecting an external leak and a bypass leakage in a filter cassette.

More specifically, in accordance with the present invention, there is provided a filter cassette for allowing a leak to be detected, the filter cassette comprising: a main body defining a first chamber, the main body comprising an inlet and an outlet; a filter separating the first chamber into first and second sub-chambers, the inlet being in fluid communication with the first sub-chamber and the second sub-chamber being in fluid communication with the outlet; a second chamber defined by the main body and the filter, wherein in absence of a leak the second chamber is substantially not in fluid communication with the first chamber; and a port being in fluid communication with the second chamber; whereby measuring a fluid characteristic in the second chamber by means of the port enables detecting a sufficient leak.

According to a second aspect of the present invention, there is provided a filter cassette for allowing an external leak or a bypass leakage to be detected, the filter cassette being in an ambient environment and comprising: a cap having: a first upper portion; a first lower portion having an external surface and a lower perimeter, the external surface having a depression; a first wall separating the first upper and first lower portions; and an inlet being provided through the first wall; a base having: a second upper portion having an internal surface and a port defined therethrough; a second lower portion; a second wall separating the second upper and second lower portions; and an outlet being provided through the second wall; and a filter; wherein upon assembly: the second upper portion accommodates the first lower portion so as to form a first chamber delineated by the first and second walls; the filter is interposed between the first and second walls and is maintained between the lower perimeter and the second wall; and the depression on the external surface of the first lower portion and the internal surface of the second upper portion define a second chamber communicating with the ambient environment through the port, wherein in absence of external leak or a bypass leakage the second chamber is generally isolated from the first chamber.

According to a third aspect of the present invention, there is provided a method for detecting a leak in a filter cassette, the method comprising the steps of: (a) providing a filter cassette comprising: a main body defining a first chamber, the main body comprising an inlet and an outlet; a filter separating the first chamber into first and second sub-chambers, the inlet being in fluid communication with the first sub-chamber and the second sub-chamber being in fluid communication with the outlet; a second chamber defined by the main body and the filter, wherein in absence of a leak the second chamber is substantially not in fluid communication with the first chamber; and a port being in fluid communication with the second chamber; and (b) measuring a fluid characteristic in the second chamber by means of the port.

The foregoing and other objects, advantages and features of the present invention will become more apparent upon reading of the following non-restrictive description of an illustrative embodiment thereof, given by way of example only, with reference to the accompanying drawings.

DETAILED DESCRIPTION OF THE INVENTION

A filter cassette for allowing an external leak or a bypass leakage according to a non-restrictive illustrative embodiment of the present invention will now be described. It is to be noted that in the present description, "a leak" is a generic term that encompasses an external leak and/or a bypass leakage.

Figure 4:
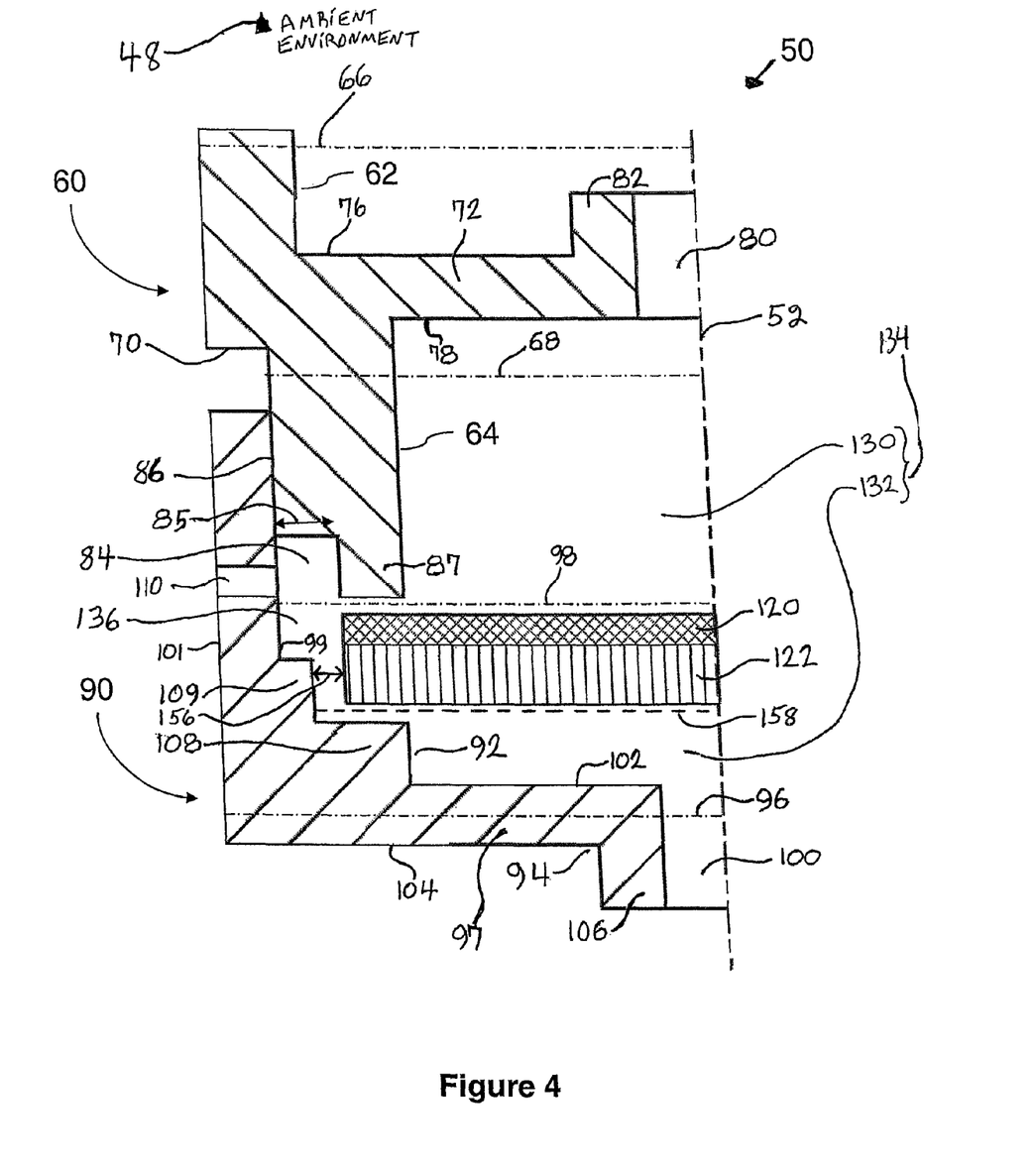
FIG. 4 is a diametrical cross-sectional view of half of a filter cassette according to a non-restrictive illustrative embodiment of the present invention, wherein a cap and a backup pad are not properly compressed by a cap and a base, thus inducing a potential bypass leakage.

Turning now to FIG. 4, a filter cassette 50, which is in an ambient environment 48, will be described according to an illustrative embodiment of the present invention.

The filter cassette 50 comprises a cap 60 and a base 90. Both the cap 60 and the base 90 have generally a cylindrical shape and are aligned according to a common longitudinal axis 52. It is to be noted that the cap 60 and the base 90 can have a slightly conical shape, so as to allow, when desired, a snugger fit when assembled. Moreover, the slightly conical shape can help prevent a tear of filter 120 and/or backup pad 122 when they are compressed between the cap 60 and the base 90. In order to facilitate a stripping during a manufacturing of the filter cassette 50, it is also possible for some of the filter cassette's 50 surfaces that are generally parallel to the longitudinal axis 52 to be slightly angled relative to the latter.

The cap 60 comprises an upper portion 62 and a lower portion 64. The upper portion 62 is characterized by an outer radius 66, whereas the lower portion 64 is characterized by an outer radius 68, wherein the radius 66 is larger than the radius 68 thereby defining an outer annular shoulder 70. The upper portion 62 and the lower portion 64 are separated by a wall 72, which is disk-shaped and extends perpendicularly to the longitudinal axis 52. The wall 72 has an external surface 76 and an internal surface 78. A hole 80 is defined in the center of the wall 72. The wall 72 is provided with an inlet 82 formed around the hole 80. An annular depression 84, having a radial length 85, is formed at the bottom of an external surface 86 of the lower portion 64. Depression 84 defines an annular extension 87 at a free end of lower portion 64. Although the present non-restrictive illustrative embodiment includes the annular depression 84, it is to be noted that the latter is optional.

The base 90 comprises an upper portion 92 and a lower portion 94. The upper portion 92 is characterized by an outer radius 96, so chosen as to be generally equal to outer radius 66 of upper portion 62. Similarly, upper portion 92 is characterized by an inner radius 98, so chosen as to be equal to outer radius 66 of lower portion 64. Upper portion 92 has an internal surface 99 and an external surface 101. Upper portion 92 and lower portion 94 are separated by a disk-shaped wall section 97, which is perpendicular to the longitudinal axis 52. A hole 100 is defined in the center of the wall section 97, the wall section 97 having an internal surface 102 and an external surface 104. On the external surface 104, an outlet 106 is formed around the hole 100. A first annular shoulder 108 is formed about the intersection of the wall section 97 and internal surface 99 of upper portion 92. A second annular shoulder 109 is formed adjacent to internal surface 99 and internally of first annular shoulder 108. The upper portion 92 is traversed by a port 110 which is perpendicular to longitudinal axis 52 and located just internally of the annular shoulder 108.

Internal surface 102 can comprise concentric and radial grooves (not shown). This allows a fluid to flow to outlet 100 even if the unit made of the filter 120 and the backup pad 122 is in contact with the internal surface 102.

Base 90 is so configured as to accommodate cap 60, wherein lower portion 64 of cap 60 is inserted into upper portion 92 of base 90. Cap 60 is configured so that when it is in place in base 90, port 110 is aligned with depression 84 and opens therein. It is to be noted that port 110 can also be located lower along upper portion 92 of base 90, as long as it stays above the second annular shoulder 109.

A filter 120 and a backup pad 122 are interposed between walls 72 and 97, with filter 120 being adjacent to wall 72 and backup pad 122 being adjacent to wall 97. Filter 120 and backup pad 122 both have the form of a circular disc, the radius of which is substantially equal to that of an inner radius 158 of the second annular shoulder 109 minus a gap 156, the latter being provided for facilitating a positioning of filter 120 and backup pad 122 inside a perimeter of second annular shoulder 109. Backup pad 122 rests on the annular shoulder 108, whereas filter 120 is placed onto the backup pad 122. Lower portion 64 and upper portion 92 are so configured that when assembled together, filter 120 and backup pad 122 are compressed on one (i.e. upstream) side by extension 87, and on the other (i.e. downstream) side by annular shoulder 108. In this way, a first sub-chamber 130 upstream of filter 120 and a second sub-chamber 132 downstream of backup pad 122 define a first chamber 134, which can communicate with the ambient environment 48 through inlet 80 and/or outlet 100. A second chamber 136 is defined by depression 84, and a space between the outer perimeters of backup pad 122 and filter 120, inner surface 99 and surfaces of second annular shoulder 109.

In the illustrative embodiment described hereinabove, port 110 is radial. However, it is to be noted that an axial port, or an axial/radial combination port, can also be used. Alternatively to the depression 84, grooves can be formed in the cap 60 and/or base 90 so as to form a chamber in order to prevent friction effects, the occurrence of which could impair a detection of a pressure or a flow. The skilled artisan will readily be able to choose a diameter for port 110 or dimensions for the grooves so as to avoid a friction effect therein.

Three non-restrictive illustrative methods for allowing an external leak or a bypass leakage to be detected according to the non-restrictive illustrative embodiment of the filter cassette presented hereinabove will now be described. Throughout the description of the methods, the following notation is used:

P1: pressure as measured in sub-chamber 130;
P2: pressure as measured in sub-chamber 132;
P3: pressure as measured in second chamber 136; and
$P_A$: pressure of the ambient environment 48.
Likewise:
F1: flow as measured in sub-chamber 130 from inlet 82;
F2: flow as measured in sub-chamber 132 to outlet 106; and
F3: flow as measured in second chamber 136 to port 110.

In all of the three non-restrictive illustrative methods, port 110 is used so as to have access to second chamber 136 in order to monitor a parameter therein, such as pressure P3 or flow F3, in order to detect an external leak and/or a bypass leakage.

It is also to be noted that such terms as "acceptable rate" and "acceptable limits" are to be understood as a skilled artisan would, in the context of a given user or manufacturer, and of a given end use, provided that in practice, it is likely that it is impossible to manufacture a filter cassette in which the first chamber 134 is perfectly isolated from the second chamber 136.

Method 1—Pressure Measurement

Figure 5A:
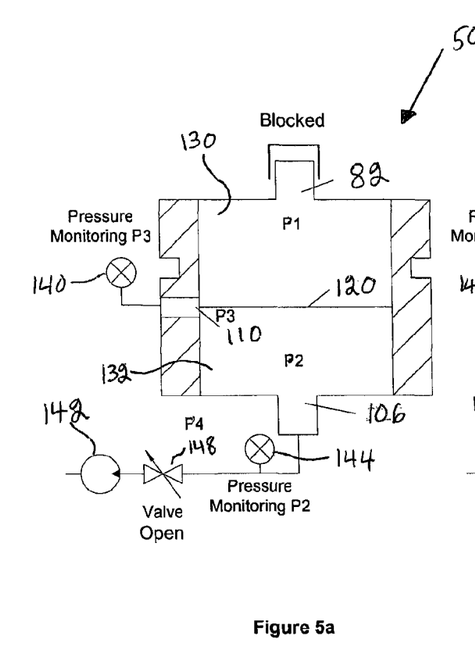
FIGS. 5a, 5b and 5c are schematic cross-sectional views of the filter cassette of FIG. 4, wherein a pressure differential is measured respectively: in a chamber for detecting a bypass leakage with an inlet being closed (FIG. 5a), and in the chamber for determining an external leak with the inlet being closed (FIG. 5b), and in the chamber for detecting a bypass leakage with the inlet being open (FIG. 5c)

It is to be noted that in method 1, port 110 is obstructed, so that P3 in chamber 136 remains generally constant, or tends slowly to reach P1 and/or P2. A pressure gauge 140 is provided so as to measure P3 in chamber 136; and a pressure gauge 144 is provided so as to measure P2 in sub-chamber 132. Pressure gauge 144 is connected to a vacuum pump 142, and a valve 148 is interposed therebetween. Valve 148 can either be in an open or a closed position.

1a—Detecting a Bypass Leakage

Valve 148 is in an open position. Then, inlet 82 is obstructed, as shown in FIG. 5a, and a vacuum is drawn at a pressure P4 from outlet 106 by using vacuum pump 142, wherein P4 is less than P1 and P2. As a result, P1 and P2 quickly reach P4. If there is no bypass leakage, P3 will stay constant or slowly decrease at an acceptable rate relative to P4. If there is a bypass leakage, P3 will decrease faster than the acceptable rate and a bypass leakage is detected.

1b—Detecting an External Leak

Figure 5B:
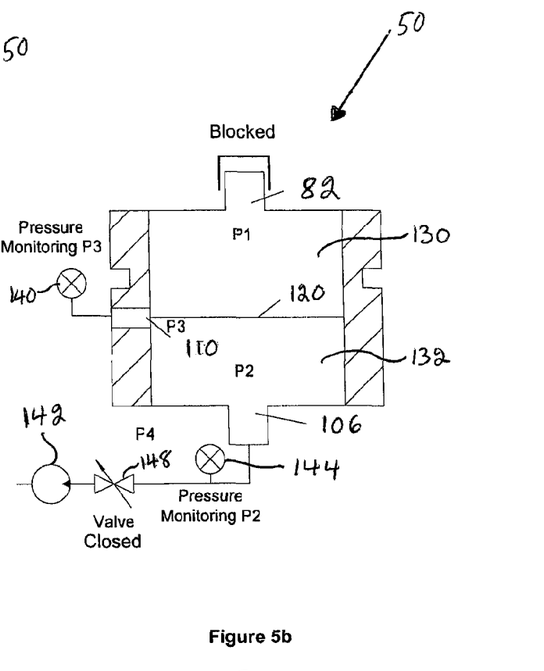

Valve 148 is in an open position. Then, inlet 82 is obstructed, as shown in FIG. 5a, and a vacuum is drawn at a pressure P4 from outlet 106 by using vacuum pump 142, wherein P4 is less than P1 and P2. Then, valve 148 is closed, as illustrated in FIG. 5b. If there is no external leak, filter cassette 50 is a closed system wherein an equilibrium is slowly reached such that P1=P2=P3=P4. If there is an external leak, P3 will increase faster than an acceptable rate and an external leak is detected.

1c—Detecting a Bypass Leakage

Figure 5C:
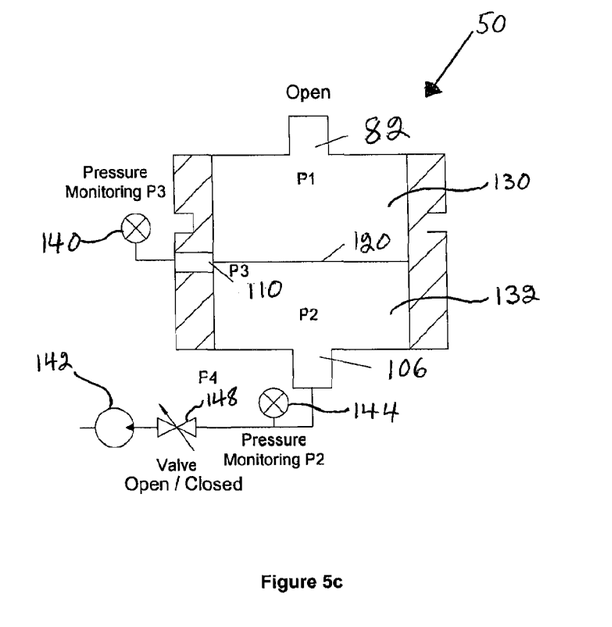

Then, the inlet 82 and/or outlet 106 is/are open, so that respectively sub-chamber 130 or sub-chamber 132 is exposed to $P_A$, as illustrated in FIG. 5c. Accordingly, P1 and P2, which were equal to P4, increase to the $P_A$. In absence of a bypass leakage, P3 remains equal to P4 and increases slowly, at an acceptable rate, to $P_A$. However, if there is a bypass leakage, P3 will increase faster than the acceptable rate and a bypass leakage is detected.

It is believed to be within the reach of those skilled in the art to envisage carrying on method 1 through alternate means, such as:
  drawing a vacuum from inlet 82 instead of outlet 106;
  using a positive pressure instead of drawing vacuum; and
  combining 1a and 1b, 1b and 1c, or 1a and 1b and 1c for enabling a complete inspection of filter cassette 50 for both an external leak and a bypass leakage.

Method 2—Flow Measurement

2a—Detecting an External Leak

Figure 6A:
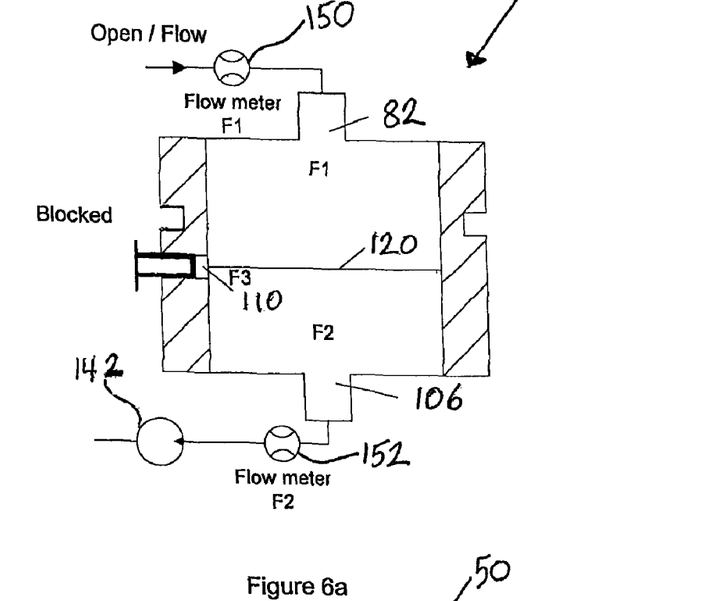
FIGS. 6a and 6b are schematic cross-sectional views of the filter cassette of FIG. 4, wherein a flow differential is measured respectively for detecting an external leak and for detecting a bypass leakage.

Inlet 82 is connected to a flow meter 150 for measuring F1, as illustrated in FIG. 6a. Outlet 106 is also connected to a flow meter 152. Port 110 is obstructed. In absence of an external leak, F1 is equal to F2. Otherwise, an external leak is detected.

2b—Detecting a Bypass Leakage

Figure 6B:
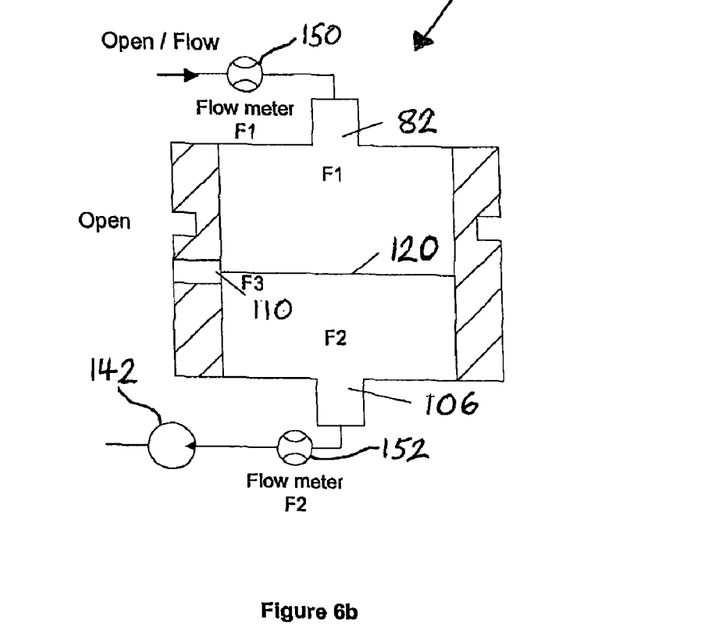

Then, port 110 is opened to the ambient environment, as illustrated in FIG. 6b. If F1 is still equal to F2, then there is no bypass leakage. Otherwise, a bypass leakage is detected.

It is believed to be within the reach of those skilled in the art to envisage carrying on method 2 through alternate means, such as:
  applying a flow at outlet 106 instead of inlet 82; and
  inducing a flow by pressurizing filter cassette 50 instead of drawing a vacuum, for example by means of the vacuum pump 142 and/or another pump (not shown) for forcing a flow into the filter cassette 50 and increasing the pressure therein.

Method 3—Flow Measurement

Figure 7:
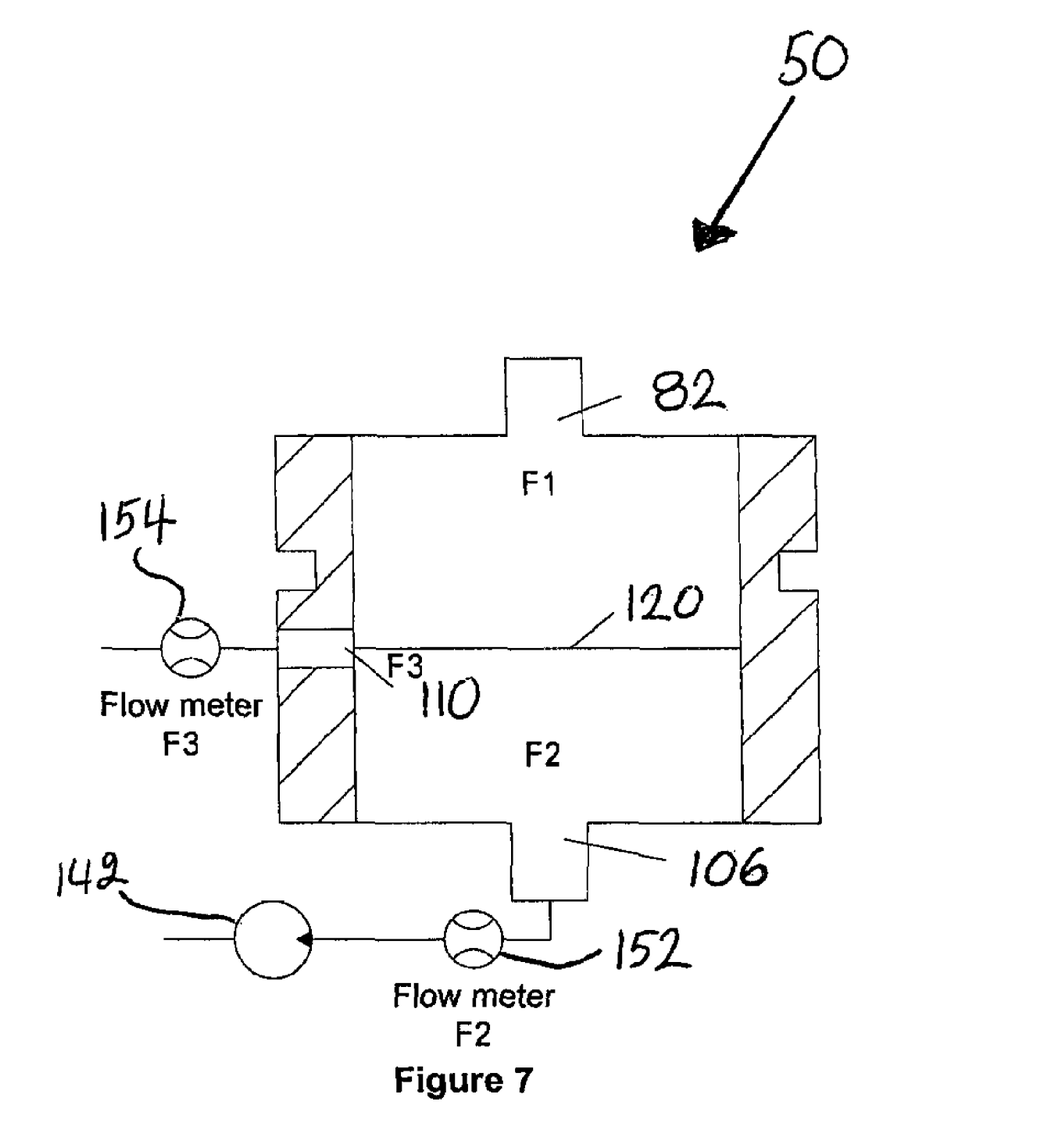
FIG. 7 is a schematic cross-sectional view of the filter cassette of FIG. 4, wherein a flow differential is measured for detecting at least one of an external leak and a bypass leakage.

Referring now to FIG. 7, inlet 82 is left open. Using vacuum pump 142, a flow is induced to enter from inlet 82 to outlet 106. F3 is measured by using a flow meter 154. If F3 is equal to zero (0) or is within acceptable limits, then no external leak and/or bypass leakage is detected. Otherwise, there exists at least one of an external leak and a bypass leakage.

It is believed to be within the reach of those skilled in the art to envisage carrying on method 3 through alternate means, such as:
  applying a flow from the outlet 106 instead of inlet 82; and
  inducing a flow by pressurizing filter cassette 10 instead of drawing a vacuum.

Cassette Use

Once the cassette has been determined to be acceptable, i.e. no undue external leak and/or bypass leakage, the port 110 may be obstructed temporarily or permanently, or may be left open.

Although the present invention has been described hereinabove by way of non-restrictive, illustrative embodiments thereof, these embodiments can be modified at will, within the scope of the appended claims, without departing from the spirit and nature of the subject invention.

REFERENCES

[1] Baron P A [2003]. Aerosol Sampling: Factors Affecting Aerosol Sampling. NIOSH Manual of Analytical Methods, Chapter O, pp. 184-207.
[2] Baron P A [2003]. Aerosol Sampling: Minimizing Particle Loss from Cassette Bypass Leakage. NIOSH Manual of Analytical Methods, Chapter N, pp. 179-83.
[3] Baron P A [2002]. Using a Filter Bypass Leakage Test for Aerosol Sampling Cassettes. Appl Occup Env Hyg, pp. 593-597.
[4] Baron P A, Khanina A, Martinez A B, Grinshpun S A [2002]. Investigation of Filter Bypass Leakage and a Test for Aerosol Sampling Cassettes. Aerosol Sci Technol, 36:857-865.
[5] Baron P A, Bennett J S [2002]. Calculation of Leakage and Particle Loss in Filter Cassettes. Aerosol Sci Technol, 36: 632-641.
[6] Van den Heever D J [1994]. Quantification of Bypass Leakage in Two Different Filter Cassettes during Welding Fume Sampling. Am Ind Hyg Assoc. J, 55: 966-969.
[7] WK4346 New Standard Specification for the Reduction and Control of Bypass Leakage and Dust Sample Losses of Personal Air Sampling Cassettes. http://www.astm.org/cqi-bin/SoftCart.exe/DATABASE.CART/WORKITEMS/WK4346.htm?L+mystore+layx9313
[8] Omega Field Cassette Leak Tester. http://www.omegaspec.com/products/ShowProducts.asp?CatNo=225-8531

The invention claimed is:

1. A filter cassette for allowing a leak to be detected, the filter cassette comprising:
a main body defining a first chamber, the main body comprising an inlet and an outlet;
a filter separating the first chamber into first and second sub-chambers, the inlet being in fluid communication with the first sub-chamber and the second sub-chamber being in fluid communication with the outlet;
a second chamber defined by the main body and the filter, wherein in absence of a leak the second chamber is substantially not in fluid communication with the first chamber; and
a port being in fluid communication with the second chamber;
wherein measuring a fluid characteristic in the second chamber by means of the port enables detecting a sufficient leak.

2. A filter cassette as recited in claim 1, wherein the main body comprises a base and a cap separable from the base, and wherein the cap and the base are configured to frictionally fit together.

3. A filter cassette as recited in claim 2, wherein the main body further comprises a ring interposed between the cap and the base.

4. A filter cassette as recited in claim 2, wherein:
the cap comprises: a first upper portion; a first lower portion having an external surface, the external surface having a depression; and a first wall separating the first upper and first lower portions; wherein the inlet is provided through the first wall;
the base comprises: a second upper portion having an internal surface; a second lower portion;
and a second wall separating the second upper and second lower portions; wherein the outlet is provided through the second wall, and the port is defined through the second upper portion; and
the second upper portion accommodates the first lower portion so as to form the first chamber between the first and second walls.

5. A filter cassette as recited in claim 4, wherein:
the filter is interposed between the first and second walls;
the first lower portion further comprises a lower perimeter; and
the filter is maintained between the lower perimeter and the second wall.

6. A filter cassette as recited in claim 5, wherein:
the second chamber is further defined by the depression on the external surface of the first lower portion and the internal surface of the second upper portion; and
the second chamber communicates with an ambient environment through the port.

7. A filter cassette as recited in claim 5, wherein:
the base comprises a first shoulder about the intersection of the second wall and the internal surface of the second upper portion.

8. A filter cassette as recited in claim 7, wherein:
the base comprises a second shoulder upstream of the first shoulder.

9. A filter cassette as recited in claim 1, wherein a backup pad is provided immediately downstream of the filter.

10. A filter cassette for allowing an external leak or a bypass leakage to be detected, the filter cassette being in an ambient environment and comprising:
a cap having: a first upper portion; a first lower portion having an external surface and a lower perimeter, the external surface having a depression; a first wall separating the first upper and first lower portions; and an inlet being provided through the first wall;
a base having: a second upper portion having an internal surface and a port defined therethrough; a second lower portion; a second wall separating the second upper and second lower portions; and an outlet being provided through the second wall; and
a filter;
wherein upon assembly:
the second upper portion accommodates the first lower portion so as to form a first chamber delineated by the first and second walls;
the filter is interposed between the first and second walls and is maintained between the lower perimeter and the second wall; and
the depression on the external surface of the first lower portion and the internal surface of the second upper portion defines a second chamber communicating with the ambient environment through the port, wherein in absence of external leak or a bypass leakage the second chamber is generally isolated from the first chamber.

11. A method for detecting a leak in a filter cassette, the method comprising the steps of:
(a) providing a filter cassette comprising:
a main body defining a first chamber, the main body comprising an inlet and an outlet;
a filter separating the first chamber into first and second sub-chambers, the inlet being in fluid communication with the first sub-chamber and the second sub-chamber being in fluid communication with the outlet;

a second chamber defined by the main body and the filter, wherein in absence of a leak the second chamber is substantially not in fluid communication with the first chamber; and a port being in fluid communication with the second chamber; and (b) measuring a fluid characteristic in the second chamber by means of the port.

12. A method as recited in claim 11, wherein the leak is at least one of an external leak and a bypass leakage.

13. A method as recited in claim 11, wherein the fluid characteristic is at least one of a pressure and a flow.

14. A method as recited in claim 11, further comprising in step (b):

obstructing the port;

drawing a vacuum in the first chamber;

measuring a pressure in the second chamber; and according to a variation of the pressure measured in the second chamber, selecting one of (a) not detecting a bypass leakage and (b) detecting a bypass leakage.

15. A method as recited in claim 11, further comprising in step (b):

obstructing the port;

drawing a vacuum in the first chamber during a time period sufficiently long for bringing the first and the second chambers at a substantial pressure equilibrium;

obstructing the inlet and the outlet;

measuring a first pressure in the first chamber and a second pressure in the second chamber; and according to a variation between the first and the second pressures, selecting one of (a) not detecting an external leak and (b) detecting an external leak.

16. A method as recited in claim 11, further comprising in step (b):

obstructing the port;

drawing a vacuum in the first chamber during a time period sufficiently long for bringing the first and the second chambers at a substantial pressure equilibrium;

opening one element from the group consisting of the inlet, the outlet, and the inlet and the outlet;

measuring a pressure in the second chamber; and according to a variation of the pressure measured in the second chamber, selecting one of (a) not detecting a bypass leakage and (b) detecting a bypass leakage.

17. A method as recited in claim 11, further comprising in step (b):

obstructing the port;

generating a flow in the first chamber from one element from the group consisting of the inlet and the outlet;

measuring a first flow in the inlet and a second flow in the outlet; and according to a variation of the first and second flows, selecting one of (a) not detecting an external leak and (b) detecting an external leak.

18. A method as recited in claim 11, further comprising in step (b):

generating a flow in the first chamber from one element from the group consisting of the inlet and the outlet;

measuring a first flow in the inlet and a second flow in the outlet; and according to a variation of the first and second flows, selecting one of (a) not detecting a bypass leakage and (b) detecting a bypass leakage.

19. A method as recited in claim 11, further comprising in step (b):

generating a flow in the first chamber from one element from the group consisting of the inlet and the outlet;

measuring a flow in the port; and according to a variation of the flow in the port, selecting one of (a) not detecting a leak and (b) detecting a leak.

20. A method as recited in claim 18, wherein the leak is selected from the group consisting of a bypass leakage, an external leak and a combination thereof.

* * * * *